(12) United States Patent
Bidmead et al.

(10) Patent No.: US 7,738,163 B2
(45) Date of Patent: Jun. 15, 2010

(54) OPTICAL TRANSMISSION SYSTEM

(75) Inventors: Stuart Bidmead, Old Portsmouth (GB);
Steven Alleston, Leamington Spa (GB);
Anthony Walsh, Stratford Upon Avon (GB)

(73) Assignee: Ericsson AB, Stockholm (SE)

( * ) Notice: Subject to any disclaimer, the term of this patent is extended or adjusted under 35 U.S.C. 154(b) by 1008 days.

(21) Appl. No.: 10/545,392

(22) PCT Filed: Jan. 29, 2004

(86) PCT No.: PCT/GB2004/000297
§ 371 (c)(1),
(2), (4) Date: Jul. 11, 2006

(87) PCT Pub. No.: WO2004/073215
PCT Pub. Date: Aug. 26, 2004

(65) Prior Publication Data
US 2006/0269287 A1  Nov. 30, 2006

(30) Foreign Application Priority Data
Feb. 14, 2003  (GB) .................................. 0303358.6

(51) Int. Cl.
*H01S 3/00* (2006.01)
(52) U.S. Cl. ........................................ 359/334; 398/30

(58) Field of Classification Search ................... 398/30; 359/334, 337, 344
See application file for complete search history.

(56) References Cited

U.S. PATENT DOCUMENTS

| | | | |
|---|---|---|---|
| 5,488,501 A * | 1/1996 | Barnsley | 398/51 |
| 5,844,706 A | 12/1998 | Kohn et al. | |
| 5,956,165 A * | 9/1999 | Fee et al. | 398/78 |
| 5,959,750 A | 9/1999 | Eskildsen et al. | |
| 7,362,972 B2 * | 4/2008 | Yavor et al. | 398/30 |
| 2002/0048062 A1 | 4/2002 | Sakamoto et al. | |
| 2002/0114060 A1 | 8/2002 | Kobayashi et al. | |
| 2003/0011836 A1 | 1/2003 | Das et al. | |
| 2003/0072064 A1 | 4/2003 | Ohta | |
| 2005/0078351 A1* | 4/2005 | Avallone et al. | 359/334 |

FOREIGN PATENT DOCUMENTS

| | | |
|---|---|---|
| EP | 0 963 065 A2 | 12/1999 |
| GB | 2 372 655 A | 8/2002 |

* cited by examiner

*Primary Examiner*—Mark Hellner
(74) *Attorney, Agent, or Firm*—Kirschstein, et al.

(57) ABSTRACT

In an optical transmission system for transmission of data along an optical fiber link, a receiver for an optical supervisory channel is capable of detecting data at a lower rate at which a Raman pump is enabled, and at a higher rate which is commenced when the higher power of a Raman amplified signal has been received.

6 Claims, 7 Drawing Sheets

OPTICAL TRANSMISSION SYSTEM

This invention relates to optical transmission systems for transmission of data along an optical fibre link.

A known optical transmission system (FIG. 1) consists of a terminal node A, B at each end with line amplifier nodes C,D,E between. Only three such line amplifier nodes are shown, but tens of such nodes may be provided. Typically, the input of such systems consists of a number of channels of data. The data is carried as laser light with each channel having a different wavelength (denoted l1 to ln in the Figures).

The transmit part 1 of the West terminal node multiplexes the incoming channels together to produce a wavelength division multiplex (WDM). The multiplexed signal is amplified and fed into the first fibre span 2. Line amplifier nodes 3-5 connected by further fibre spans use optical amplifiers to boost the multiplexed signal. The receive part 6 of the East terminal node demultiplexes the signal back into its separate wavelengths.

The same applies in the East To West direction (7-11).

Usually optical amplification is achieved using an Erbium Doped Fiber Amplifier (EDFA). For very long spans (typically greater than 150 km) the optical amplification provided by an EDFA is not sufficient and Raman amplification is also required. Raman amplification works by pumping laser light at a wavelength lower than the WDM channels into the fibre span. Some of the energy from the Raman laser is transferred to the WDM channels causing them to be amplified.

The first fibre span 2 is long enough to require Raman amplification. FIG. 2 shows in more detail the transmit part 1 of the West terminal A, the first fibre span 2 and West-to-East amplifier 3 of the first line amplifier node C. The transmit part 1 of the West terminal consists of a Wavelength Division Multiplexer 12 that combines the separate wavelength inputs (l1 to ln) together. The WDM signal is amplified by an EDFA 13.

In line transmission systems it is common to provide an optical supervisory channel between nodes. The optical supervisory channel provides data channels between nodes to allow the nodes to be controlled and monitored. The optical supervisory channel is an optical signal at a wavelength outside the range of the input channels (l1 to ln) generated by the optical supervisory channel transmitter 14. The optical supervisory channel is added to the WDM signal at coupler 15. Both the WDM signal and the optical supervisory channel are transmitted into the fibre span 2.

At the line amplifier node 3, Raman pump laser 17 generates light that is transmitted into the fibre span via coupler 16. This light travels down the fibre span towards the West Terminal A amplifying the WDM signal and the optical supervisory channel. The WDM signal and optical supervisory channel pass through the Raman coupler 16 towards channel drop coupler 19, which separates the optical supervisory channel from the WDM signal. The optical supervisory channel is passed to the optical supervisory channel (OSC) receiver 18 and the WDM signal is passed to the EDFA 20 where it is amplified and transmitted into the next fibre span. The optical supervisory channel is regenerated at the line amplifier node by the optical supervisory channel (OSC) transmitter 21 and added to the amplified WDM signal by add coupler 22.

To achieve the required amplification the Raman pump laser generates significant optical power (typically 500 mW or more). This presents a serious risk of eye damage if viewed by a person working on this system. To prevent injury occurring it is necessary to ensure that the Raman pump laser is not enabled unless its output is safely attached to an unbroken fibre. It is common practice to use the optical supervisory channel to enable the Raman pump.

The receiver 18 monitors the incoming optical supervisory channel. If the optical supervisory channel is not present it is assumed that the fibre span 2 is broken or not attached. In this case the Raman pump laser 17 is disabled. If the optical supervisory channel is present at the receiver 18 then it is deduced that the fibre span 2 must be attached and it is safe to enable the Raman pump laser 17.

The sequence for enabling transmission over a fibre span is as follows. Firstly the optical supervisory channel is transmitted. Secondly, if the optical supervisory channel is received correctly then the Raman pump laser is enabled.

For this sequence to be possible the optical supervisory channel must be able to be transmitted over the fibre span without the aid of Raman amplification. For a low data rate optical supervisory channel (such as 2.048 Mbit/s), this is possible by using sensitive optical supervisory channel receivers.

There are requirements to increase the data rate of the optical supervisory channel to provide more capacity for control and network management data. 155.52 Mbit/s is a typical requirement for the optical supervisory channel. At higher data rates, receivers of the required sensitivity are not readily available.

The invention provides a receiver for receiving an optical supervisory channel transmitted along an optical fibre link of an optical transmission system, the receiver being capable of receiving at a first data rate, the receiver including means for enabling a Raman pump laser for injecting light into the fibre link for amplification in response to the receipt of the optical supervisory channel at the first data rate, the receiver also being capable of receiving the Raman pump amplified optical supervisory channel when transmitted at a higher data rate.

The invention also provides a transmitter for transmitting an optical supervisory channel along an optical fibre link of an optical transmission system, the transmitter being capable of transmitting at a first data rate, the transmitter also being capable of transmitting at a higher data.

Advantageously, the receiver has greater sensitivity at the low data rate such that it can operate over a long fibre span without Raman amplification, and less sensitivity at the higher data rate such that it requires Raman amplification to operate over long spans.

The optical transmission system may consist of terminal nodes and line amplifier nodes. The receivers of the invention may be located in the line amplifier nodes and in a terminal node; the Raman pump lasers may be located in the same line nodes as the receivers that enable them. The line amplifier nodes may regenerate the optical supervisory channel. The transmitters of the invention may be located in the line amplifier nodes as well as in a terminal node.

The invention will now be described in detail, by way of example, with reference to the accompanying drawings, in which.

Figure 1:
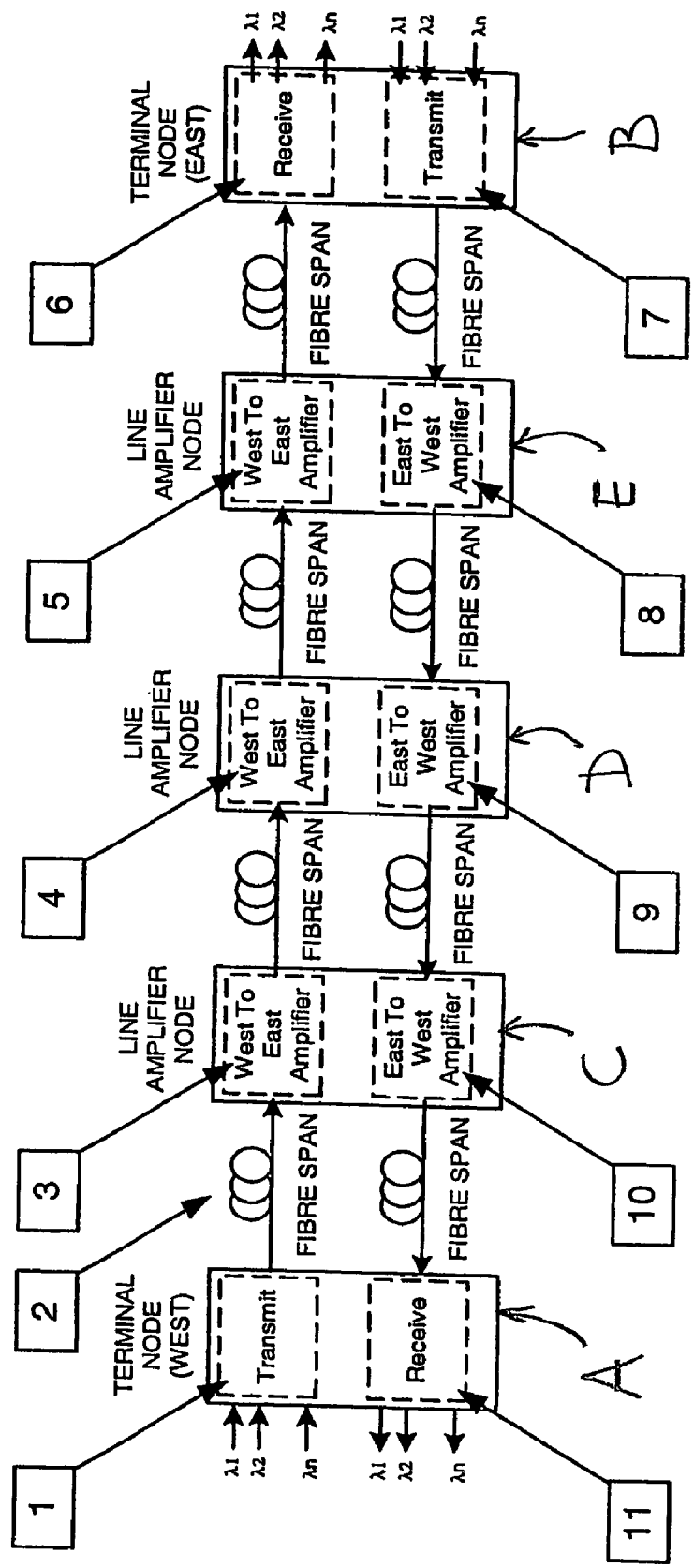
FIG. 1 is a representation of an optical line transmission system, the representation depicting both a known system and a system according to the invention.
Figure 2:
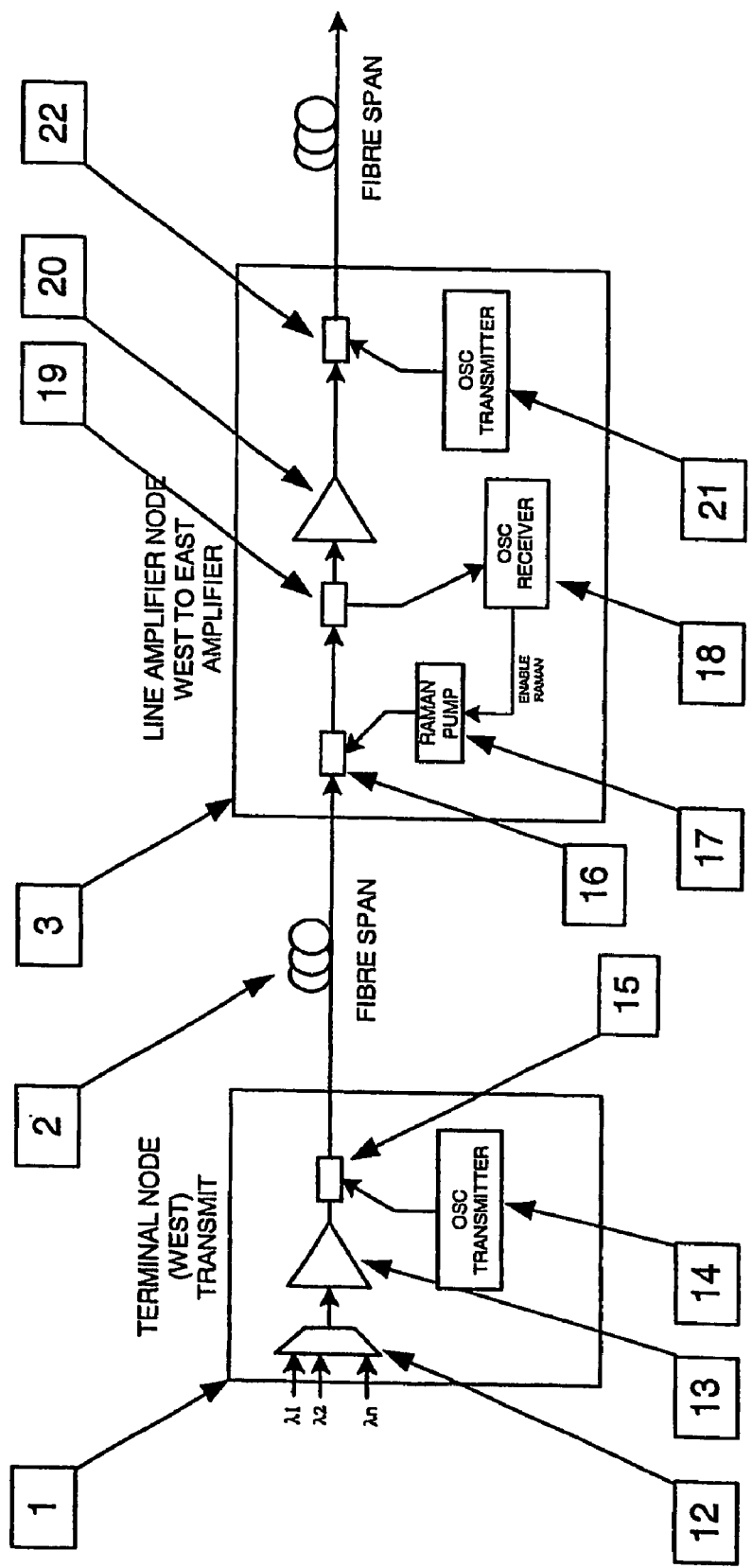
FIG. 2 is a representation in more detail of a transmitter of one terminal node and part of a first line amplifier node of the line transmission system shown in FIG. 1.

Referring to FIGS. 1 and 2, the optical transmission system of the invention has the same architecture as the known system described with reference to FIGS. 1 and 2, and thus consists of a terminal node A,B at each end with line amplifier nodes C,D,E in between, typically tens of such nodes in between. The terminal nodes and line amplifier nodes use EDFAs and, in the case of very long spans (typically greater than 150 km) Raman amplification as well. The invention is concerned with transmission and reception over those long fibre spans which require Raman amplification.

In accordance with the invention, the optical supervisory channel transmitters and receivers are dual rate over those fibre spans requiring Raman amplification. Thus, the transmitter 14 of FIG. 2 may be realized by the first or second form of transmitter shown in FIG. 3 or FIG. 4. Equally, the receiver 18 of FIG. 2 may be realized by the first, second or third form of receiver shown in FIGS. 5, 6 or 7. Any of the other optical supervisory channel transmitters or receivers of the known line transmission system of FIG. 1, such as the transmitter 21 of FIG. 2, could be realized by any of the transmitters or receivers, respectively, of the invention, where the interconnecting fibre span requires Raman amplification.

The optical supervisory channel transmitters of the invention are capable of transmitting at either a low rate, or a high rate, and the optical channel receivers of the invention are capable of receiving at the low rate and at the high rate. Referring to FIG. 2, the following sequence is used to start transmission over fibre span 2 which requires Raman amplification.

The optical supervisory channels pass control information between adjacent nodes, in this case, between terminal node A and line amplifier node C. The optical supervisory channel of transmitter 14 commences transmission at a lower data rate (less than 10 Mbit/s, typically 2.048 Mbit/s). If the optical supervisory channel is received correctly by receiver 18, then the Raman pump laser 17 is enabled, thereby amplifying both the wavelength division multiplexed signal channels and the optical supervisory channels.

Control circuits (not shown) in each node monitor the Raman pumps, in this case, control circuits in node A and node C monitor the Raman pump 17, to determine when they have started and are operating correctly. The optical supervisory channel receiver 18 will indicate increased received power due to the Raman gain. The control circuit in this node uses this information to determine that it is ready to switch to the higher transmission rate. The node, using the optical supervisory channels, indicates to control circuits in the node on the other end of the linking fibre span, in this case, the fibre span 2, that it is ready to switch to the higher rate. When the two nodes are both ready to switch, the respective control circuits simultaneously initiate operation at the higher optical supervisory channel data rate (greater than 50 Mbit/s, typically 155.52 Mbit/s). With Raman amplification, the receiver 18 is now able to receive the optical supervisory channel at the higher data rate.

The same procedure applies if the Raman pump 17 is located upstream of the fibre link 2, in the node A.

Two possible implementations of the dual rate optical supervisory channel transmitter will now be described. These are used in the line transmission system shown in FIG. 1 and FIG. 2 in place of the transmitters 14 and 21.

Figure 3:
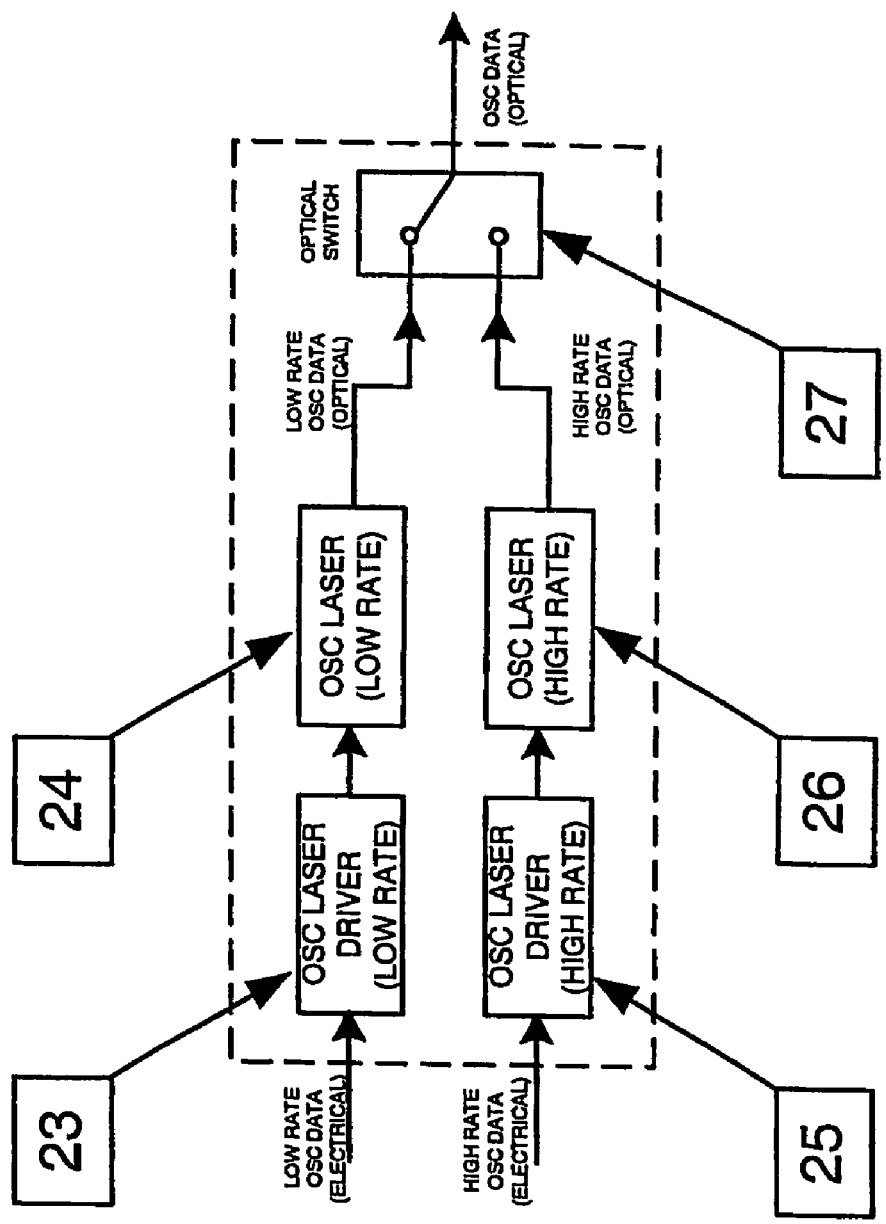
FIG. 3 is a representation of a first form of optical supervisory channel transmitter for an optical transmission system according to the invention.

FIG. 3 shows the first implementation of a dual rate optical supervisory channel transmitter. This implementation uses two separate lasers 24, 26 to provide the different rate optical supervisory channels. The low rate optical supervisory channel data is input to the low rate laser driver 23 as an electrical signal. This modulates the low rate optical supervisory channel laser 24 to convert the optical supervisory channel data from electrical to optical format. Similarly the high rate optical supervisory channel data is input to the high rate laser driver 25 as an electrical signal. This modulates the high rate optical supervisory channel laser 26 to convert the optical supervisory channel data from electrical to optical format. An optical switch 27 is used to select whether the optical output of the optical supervisory channel transmitter will be the high rate or low rate optical supervisory channel. Control circuits (not shown) in the nodes on each side of the fibre link (not shown) connected to the transmitter shown in FIG. 3 control the switch-over from lower data rate to higher data rate, as described above.

Figure 4:
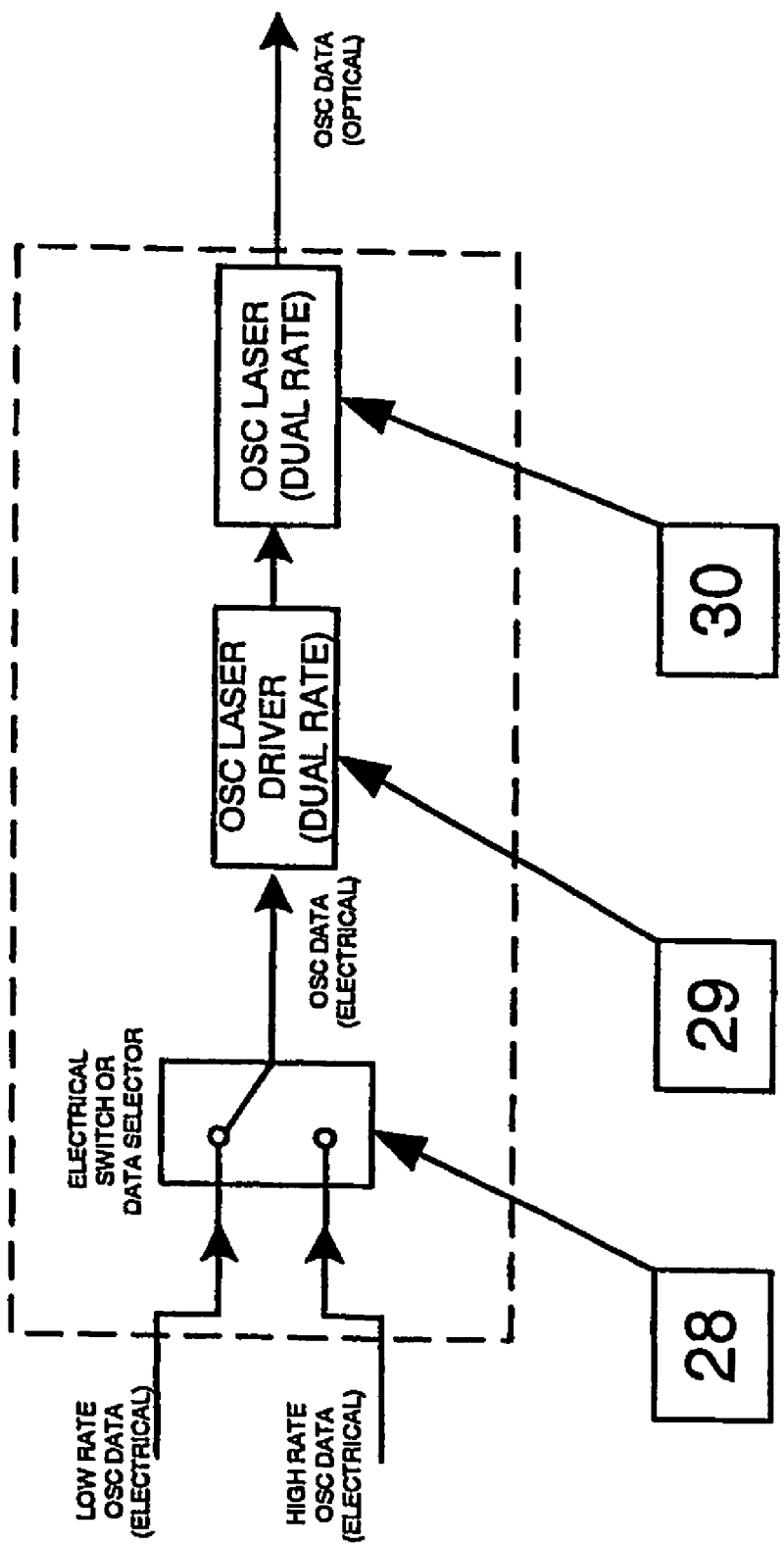
FIG. 4 is a representation of a second form of optical supervisory channel transmitter for an optical transmission system according to the invention.

FIG. 4 shows the second implementation of a dual rate optical supervisory channel transmitter. This implementation uses one laser 30 and selects the data electrically to provide the different rate optical supervisory channels. The low rate optical supervisory channel data and high rate optical supervisory channel data are input to the switch 28 as electrical signals. The switch selects which electrical signal to be input to the laser driver 29. The laser driver 29 modulates the optical supervisory channel laser 30 to convert the optical supervisory channel data from electrical to optical format. The laser driver 29 and optical supervisory channel laser 30 in this implementation can operate at either data rate. This implementation has the advantage over the implementation shown in FIG. 3 that it uses a lower number of optical components and is therefore a lower cost solution, but the procedure for switch-over is the same.

Three possible implementations of a dual rate optical supervisory channel receiver will now be described. These are used in the line transmission system shown in FIG. 1 and FIG. 2 in place of the receiver 18.

Figure 5:
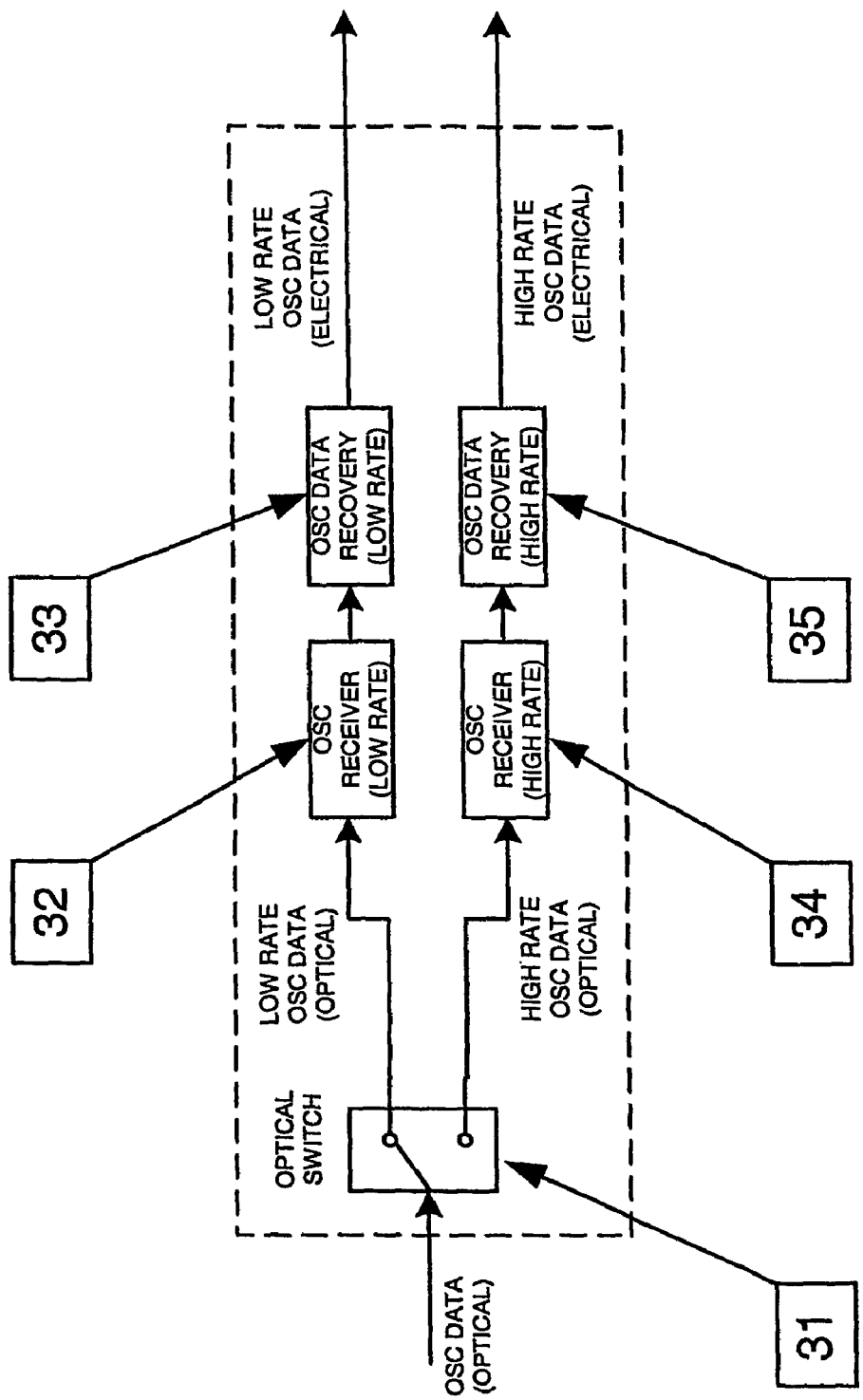
FIG. 5 is a representation of a first form of optical supervisory channel receiver for an optical transmission system according to the invention.

FIG. 5 shows the first implementation of a dual rate optical supervisory channel receiver. A low rate receiver 32 is provided to convert the low rate optical supervisory channel from optical to electrical format. A low rate data recovery circuit 33 recovers the digital optical supervisory channel data from the electrical signal. Similarly a high rate receiver 34 and high rate data recovery circuit 35 are provided for the high rate optical supervisory channel. An optical switch 32 is used to select which rate is being received. The procedure for switch-over uses control circuits in the nodes on each side of the fibre link feeding the receiver shown in FIG. 5, as described above, and the procedure is the same for the embodiments shown in FIGS. 6 and 7.

Figure 6:
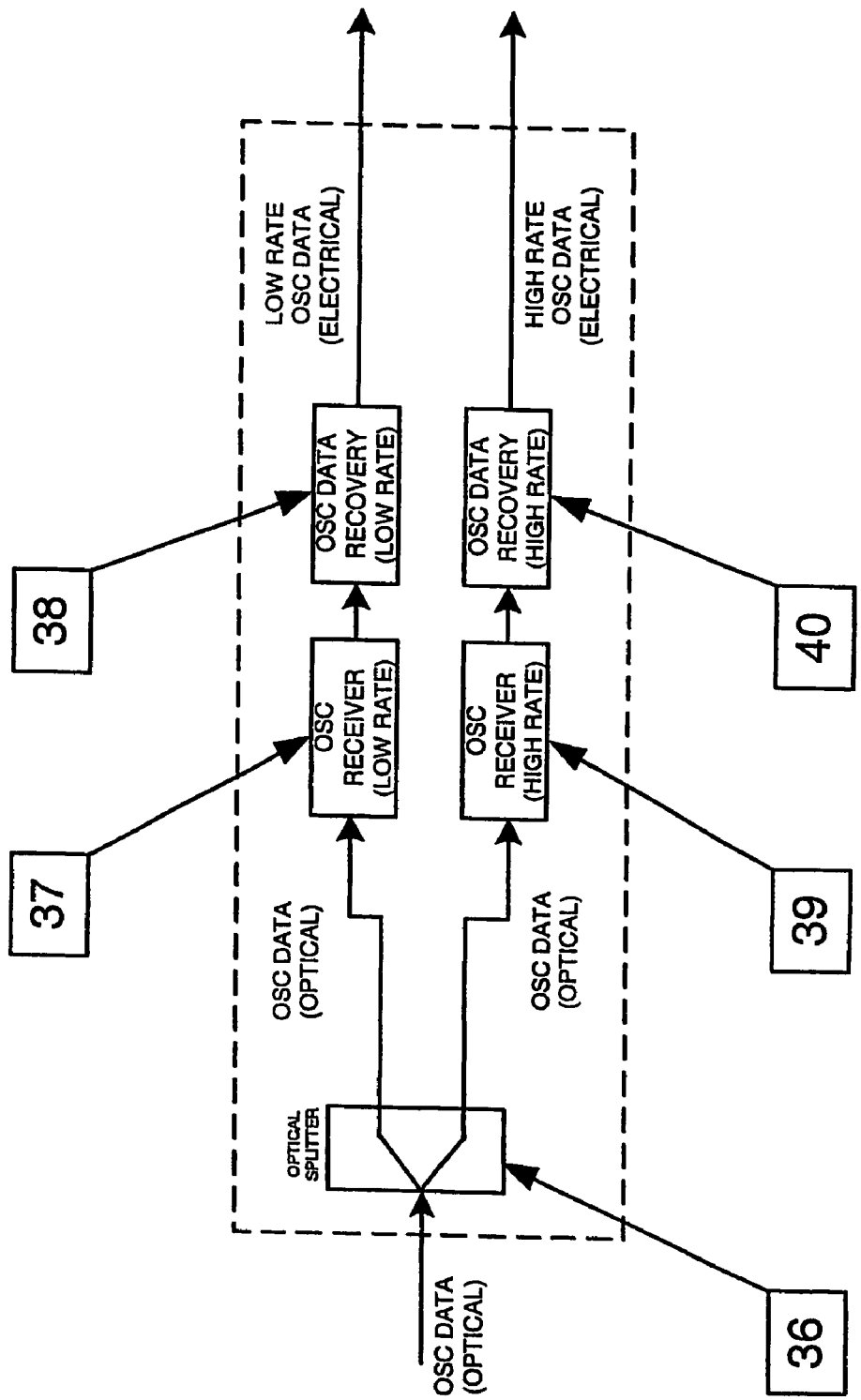
FIG. 6 is a representation of a second form of optical supervisory channel receiver for an optical transmission system according to the invention.

FIG. 6 shows the second implementation of a dual rate optical supervisory channel receiver. The optical supervisory channel optical signal is split into two paths by an optical splitter 36. Each path has approximately half the power of the incoming signal.

One path is fed to a low rate receiver 37 that converts the low rate optical supervisory channel from optical to electrical format. A low rate data recovery circuit 38 recovers the digital optical supervisory channel data from the electrical signal. Similarly a high rate receiver 39 and high rate data recovery circuit 40 are provided for the other path from the splitter.

Both receivers 37,39 and both data recovery circuits 38,40 operate simultaneously. When high rate optical supervisory channel data is being received only the high rate data recovery circuit 40 will detect valid data and the low rate data output will be disabled. Conversely when low rate optical supervisory channel data is received only the low rate data recovery circuit 38 will detect valid data and the high rate data output will be disabled.

Figure 7:
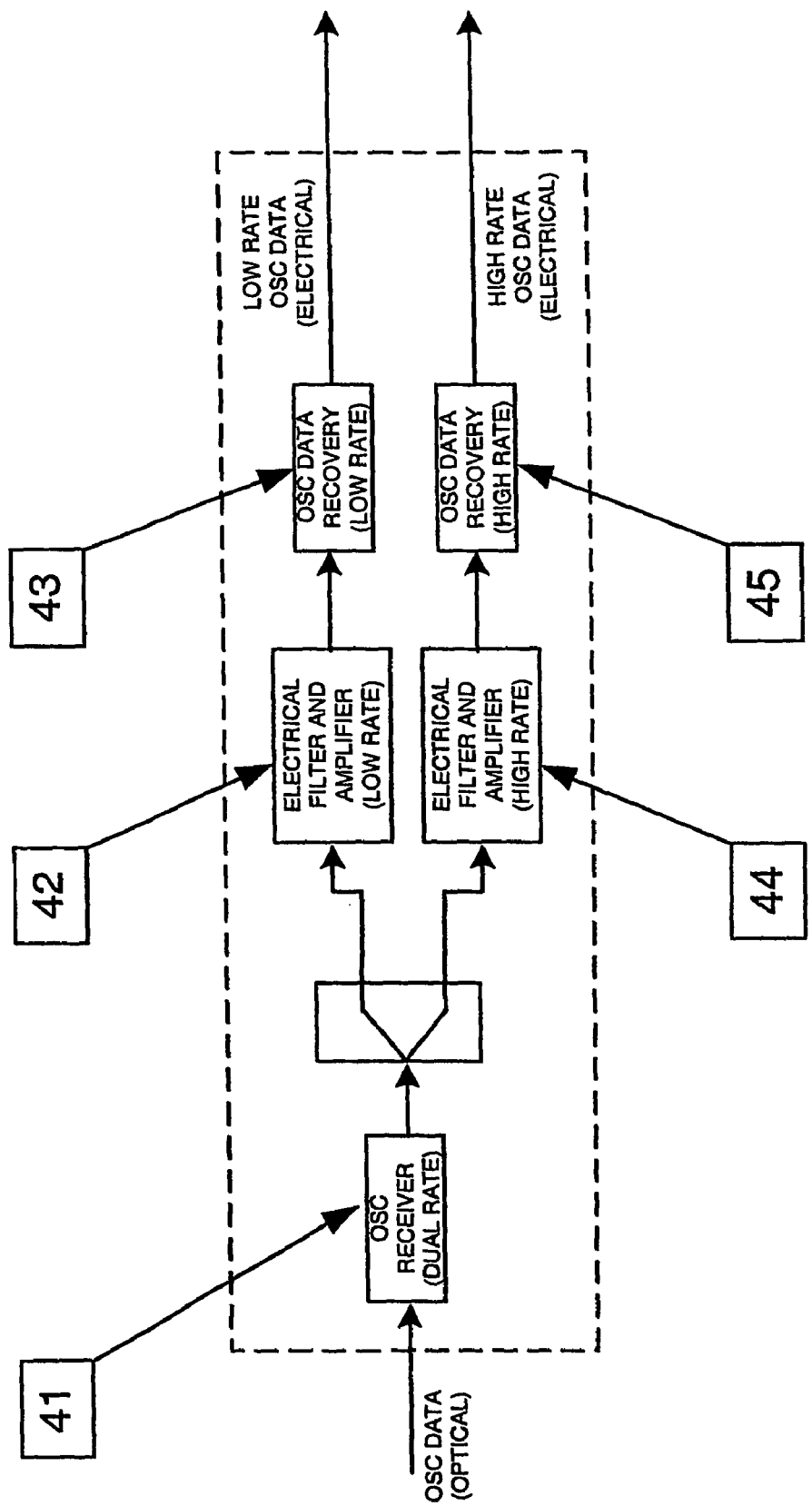
FIG. 7 is a representation of a third form of optical supervisory channel receiver for an optical transmission system according to the invention.

FIG. 7 shows the third implementation. The optical supervisory channel optical data is input to a single optical receiver 41. The receiver output is split electrically and fed to two electrical filter circuits. Filter 42 is a low rate filter and amplifier that amplifies the low rate optical supervisory channel signal but does not allow the high rate optical supervisory channel signal through. The output of this filter is fed to tie low rate data recovery circuit 43.

Filter 44 is a high rate filter and amplifier that amplifies the high rate optical supervisory channel signal but does not allow the low rate optical supervisory channel signal through. The output of this filter is fed to the high rate data recovery circuit 45. When high rate optical supervisory channel data is being received only the high rate data recovery circuit 45 will detect valid data and the low rate data output will be disabled. Conversely, when low rate optical supervisory channel data is received only the low rate data recovery circuit 43 will detect valid data and the high rate data output will be disabled.

The invention claimed is:

1. A transmitter for transmitting an optical supervisory channel at a first data rate along an optical fiber link of an optical transmission system, the transmitter comprising: means for transmitting the optical supervisory channel at a second data rate that is higher than the first data rate in response to Raman amplification commencing in the optical fiber link.

2. The transmitter as claimed in claim 1, in which the higher second data rate is at least twice the first data rate.

3. The transmitter as claimed in claim 2, in which the higher second data rate is at least five times the first data rate.

4. The transmitter as claimed in claim 3, in which the higher second data rate is at least ten times the first data rate.

5. The transmitter as claimed in claim 1, including a single laser for transmitting the optical supervisory channel at either data rate.

6. The transmitter as claimed in claim 1, including a laser for transmitting at each data rate, and an optical switch for selecting a desired laser.

* * * * *